United States Patent
Carbone et al.

(10) Patent No.: US 12,394,781 B2
(45) Date of Patent: Aug. 19, 2025

(54) PROCESS FOR THE PRODUCTION OF A SULFUR-CARBON COMPOSITE MATERIAL, COMPOSITE MATERIAL THUS OBTAINED AND ELECTRODE FOR LITHIUM-SULFUR BATTERIES PRODUCED WITH THE MATERIAL

(71) Applicant: FONDAZIONE ISTITUTO ITALIANO DI TECNOLOGIA, Genoa (IT)

(72) Inventors: Lorenzo Carbone, Rome (IT); Eleonora Venezia, Genoa (IT); Vittorio Pellegrini, Gragnano (IT); Francesco Bonaccorso, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 641 days.

(21) Appl. No.: 17/641,678

(22) PCT Filed: Sep. 11, 2020

(86) PCT No.: PCT/IB2020/058472
§ 371 (c)(1),
(2) Date: Mar. 9, 2022

(87) PCT Pub. No.: WO2021/048815
PCT Pub. Date: Mar. 18, 2021

(65) Prior Publication Data
US 2022/0320491 A1    Oct. 6, 2022

(30) Foreign Application Priority Data

Sep. 12, 2019 (IT) .................. 102019000016178

(51) Int. Cl.
*H01M 4/36* (2006.01)
*H01M 4/133* (2010.01)
(Continued)

(52) U.S. Cl.
CPC .......... *H01M 4/364* (2013.01); *H01M 4/133* (2013.01); *H01M 4/38* (2013.01); *H01M 4/583* (2013.01);
(Continued)

(58) Field of Classification Search
CPC ..... C01B 17/02; C01B 17/0248; C01B 32/16; C01B 32/70; H01M 4/133; H01M 4/364; H01M 4/625
See application file for complete search history.

(56) References Cited

U.S. PATENT DOCUMENTS

| 12,080,888 | B2* | 9/2024 | Lee ................ | H01M 4/364 |
| 2013/0164625 | A1* | 6/2013 | Manthiram ........ | H01M 4/625 |
| | | | | 977/734 |

FOREIGN PATENT DOCUMENTS

| CN | 103107318 A | * | 5/2013 | |
| CN | 103647065 A | * | 3/2014 | ............ B82Y 30/00 |

(Continued)

OTHER PUBLICATIONS

Machine translation of CN 103107318 (no date) (Year: 0000).*
(Continued)

*Primary Examiner* — Amanda C. Walke
(74) *Attorney, Agent, or Firm* — Troutman Pepper Locke LLP (57) ABSTRACT

The present invention refers to a process for the production of a sulfur-carbon composite material, to the material obtained by the process, and to an electrode for lithium-sulfur rechargeable batteries produced using this composite material.

10 Claims, 4 Drawing Sheets

(51) Int. Cl.
- *H01M 4/38* (2006.01)
- *H01M 4/583* (2010.01)
- *H01M 4/62* (2006.01)
- *H01M 4/66* (2006.01)
- *H01M 10/052* (2010.01)

(52) U.S. Cl.
CPC ........... *H01M 4/623* (2013.01); *H01M 4/625* (2013.01); *H01M 4/661* (2013.01); *H01M 4/663* (2013.01); *H01M 10/052* (2013.01)

(56) References Cited

FOREIGN PATENT DOCUMENTS

| | | | | |
|---|---|---|---|---|
| CN | 103700859 A1 | | 4/2014 | |
| CN | 108258206 A | * | 7/2018 | .......... H01M 10/052 |
| CN | 108258208 A | * | 7/2018 | ............. B82Y 30/00 |
| CN | 105990569 B1 | | 10/2018 | |
| CN | 112786826 A | * | 5/2021 | .......... H01M 4/0416 |
| CN | 113130892 A | * | 7/2021 | .......... H01M 10/052 |
| DE | 102013005082 A1 | * | 3/2014 | ............. H01M 4/13 |
| EP | 3483958 A1 | | 5/2019 | |
| KR | 20210080151 A | * | 6/2021 | |
| RU | 2796628 C2 | * | 5/2023 | |

OTHER PUBLICATIONS

International Search Report and Written Opinion for corresponding Application No. PCT/IB2020/058472 (mailed Apr. 12, 2020).

* cited by examiner

PROCESS FOR THE PRODUCTION OF A SULFUR-CARBON COMPOSITE MATERIAL, COMPOSITE MATERIAL THUS OBTAINED AND ELECTRODE FOR LITHIUM-SULFUR BATTERIES PRODUCED WITH THE MATERIAL

This application is a national stage application under 35 U.S.C. § 371 of PCT Application No. PCT/IB2020/058472, filed Sep. 11, 2020, which claims the priority benefit of Italian Patent Application No. 102019000016178, filed Sep. 12, 2019.

FIELD OF THE INVENTION

The present invention refers to a process for the production of a sulfur-carbon composite material, to the material obtained by the process, and to an electrode for lithium-sulfur rechargeable batteries produced using this composite material.

STATE OF THE ART

Currently, a growing variety of products require the use of rechargeable batteries. A first class of products using rechargeable batteries are portable electronic devices, in particular smartphones, tablets, and personal computers; besides, the demand for high energy and power density rechargeable batteries by the automotive sector is rapidly expanding, for use on both hybrid and fully electric vehicles. In addition to constant increase in the number of devices requiring the use of rechargeable batteries, market developments require improvements in stability, durability, and energy capacity. Current lithium batteries are unable to meet these demands and there is therefore an intense research for new types of rechargeable batteries. Given the large amount of rechargeable batteries required in the near future, especially in the transport sector, it is necessary that new generation rechargeable batteries are produced with environmentally friendly processes in order to allow mass production and, at the same time, reduce environmental risks in the use of sustainable low-impact resources.

One of the most promising candidates for the next generation of energy storage devices are lithium-sulfur rechargeable (or secondary) batteries (Li—S batteries). These batteries have a very interesting combination of characteristics for their intended applications. First of all, from an environmental and safety point of view, sulfur is biocompatible and non-toxic, and it is also abundant in nature and, last but not least, inexpensive. From a battery performance standpoint, a sulfur-based cathode has a theoretical specific capacity of 1675 mAh/g, about 10 times greater than the typical cathode for lithium-ion batteries, and a theoretical energy density of ~3500 Wh/kg when referred to the average working voltage of 2.2 V.

The reactions occurring at the battery electrodes are as follows:

at the anode: $Li \leftrightarrows Li^+ + e^-$ (1)

at the cathode: $Li_2S \leftrightarrows S + 2Li^+ + 2e^-$ (2)

During the discharge phase, lithium dissolution occurs at the anode with the consequent reaction of sulfur reduction at the cathode. During the charging phase, the two reactions take place in the opposite direction, the lithium is reduced by crystallizing on the anode electrode, acting in this case as the cathode, and the sulfur present as $Li_2S$ is reoxidized to elemental sulfur, mainly in the form of cyclic molecule $S_8$, at the cathode electrode, acting in this case as the anode.

A problem that has so far prevented large-scale application of Li—S batteries is their rapid degradation during discharge and recharge cycles. The main cause of this degradation is the phenomenon known as the "shuttle" effect. The reduction of sulfur in the discharge phase actually occurs according to a much more complex mechanism than the simplified reaction (2) reported above; and involves the formation of lithium polysulfides of general formula $Li_2S_x$, wherein x ranges between 1 and 8. These compounds are highly soluble in common organic electrolytes used in Li—S batteries and can therefore be released by the cathode and migrate to the anode, where they are reduced consuming lithium, diffuse back to the cathode to reform long chain polysulfides, and so on, leading to a continuous loss of active material from the electrode. In addition to loss of active material, the "shuttle" effect is responsible for the self-discharge characteristic of Li—S batteries in which sulfur is solubilized in the electrolyte also in rest conditions.

A first possible way explored to overcome, or at least mitigate, the problem is the replacement of traditional electrolytes with particular liquid electrolytes in which lithium polysulfides have a reduced solubility (for example, solutions of lithium bis(trifluoromethanesulfonimide) in mixtures of ethers), or the use of sold or semi-solid electrolytes.

Most of the research, however, has focused on development of composite materials for producing the sulfur electrode (the cathode during the battery discharge phase). Composite materials consisting of sulfur dispersed in a porous carbon form and/or with a high specific area (surface area per unit of weight), such as activated carbon, carbon nanotubes, graphene and the like, are the most studied for this purpose. In addition to providing a support for sulfur and blocking lithium polysulfides, the carbon component also has the property of carrying current, thus avoiding the need for an additional support electrode. By operating in this way, it is possible to increase the contribution of the active material to the battery capacity.

A possible preparation method for these composites is described in the article "A three dimensional sulfur/reduced graphene oxide with embedded carbon nanotubes composite as a binder-free, free-standing cathode for lithium-sulfur batteries", K. Ying et al., RSC Adv., 2017, 7, 43483-43490. The method of this document includes the steps of dissolving sulfur in ethanol and suspending carbon nanotubes (CNTs) in the solution; separately, preparing a suspension of graphene oxide in deionized water; dropping this suspension into the sulfur solution; reducing the volume of the solution by evaporating part of the ethanol; adding ascorbic acid to reduce graphene oxide; pouring the mixture mold and heating at 75° C. for 4 hours to obtain hydrogels with a 3D structure of graphene loaded with sulfur; soaking the hydrogel in water for 24 hours and finally extracting the water by freeze-drying to obtain a graphene aerogel. This immediately appears a very burdensome procedure for an industrial application, especially taking into account that the authors declare that the slower the step of adding the graphene oxide suspension to the sulfur solution (with CNTs) in ethanol the better the results are, which necessarily leads to an extension of production times. Furthermore, the best result achieved by the material prepared in the article is a specific capacity value of 1025 mAh/g at the third discharge cycle (after an initial phase of activation of the materials), which drops to values below 1000 mAh/g after about 10 cycles.

Another method of preparation of these composites is described in the article "Acetylene black/sulfur composites synthesized by a solution evaporation concentration crystallization method and their electrochemical properties for Li/S batteries", H. Tan et al., Energies 2013, 6, 3466-3480. In the method of this article, a solution of sulfur in carbon disulfide, $CS_2$, is prepared, in which acetylene black (a form of carbon black obtained by pyrolysis without combustion of acetylene, indicated in the article as AB) is suspended; the solvent is then evaporated and the product obtained after drying is mixed with additional AB and polyvinylidene fluoride (PVDF) in percentages of the three components of 70%, 20% and 10% by weight, respectively; a slurry is formed with the mixture and N-methyl-2-pyrrolidone (NMP) which is then coated on aluminum sheets. The method is somewhat laborious in view of an industrial production, as it requires, after the preparation of the AB/sulfur composite, further mixing with other components. The article also studies composites with three different S:AB weight ratios, equal to 0.56:1, 1:1 and 5.67:1, and the results show a monotonous reduction of the specific capacity as said ratio, and thus the amount of sulfur in the composite, increases; the authors conclude that with the higher amount of sulfur, the "shell" effect of the AB layer is reduced, leaving S particles exposed, with worsening of the results. Finally, the two materials that performed best in this study (those with a S:AB ratio equal to 0.56:1 and 1:1) have a specific capacity close to the theoretical value of 1675 mAh/g when freshly prepared, but this capacity rapidly decreases to values of between 1300 and 1400 mAh/g after only 10 discharge/recharge cycles.

Patent application EP 3483958 A1 describes a method for the production of a cathode for Li—S batteries produced by soaking a carbon material in a supersaturated suspension of sulfur in an organic solvent (typically acetone), causing the dissolved sulfur to be adsorbed in the porosities of the carbon material, and evaporating the solvent. According to this document, the weight ratio between S and C may range between 10:90 and 85:15, that is, between 0.11 and 5.67; the maximum S:C ratio is therefore the same as in the article by Tan et al. mentioned above.

Patent application CN 103700859 A describes a sulfur-carbon composite material and its use as a cathode in Li—S batteries. According to the teachings of this document, the carbon material (in this case amorphous carbon) must be doped with an amount of about 2% by weight of nitrogen, obtained by thermal decomposition of polypyrrole. The amount of sulfur in the S—C material of this document can range between 69 and 89% by weight, i.e. a range of S:C ratios of between about 2.23 (69:31) and 8.09 (89:11). This document too reports that as the S:C ratio increases, the battery properties worsen: in paragraph [0029] it is described that good results are obtained with a material having a sulfur content of 74% (S:C ratio≈2.85), while by increasing this content to 83% and 89% (S:C≈4.88 and 8.09) the battery discharge capacity is significantly reduced.

According to the prior art, therefore, the performance of batteries worsens as the S:C ratio in the cathodes increases, and the available evidence indicates that the value of this ratio should not exceed about 8.

The object of the present invention is to provide a process for the production of a sulfur-carbon composite material that is simpler and easier to industrialize than the prior art ones, and that allows to obtain an electrode for high performance lithium-sulfur rechargeable batteries.

SUMMARY OF THE INVENTION

This object is achieved with the present invention that, in a first aspect thereof, relates to a process for the production of a sulfur-carbon composite material that comprises the following steps:

a) preparing a sulfur solution in a solvent different from carbon disulfide and having a boiling temperature lower than the melting temperature of sulfur, operating at a temperature of between 15° C. and the boiling temperature of the solvent;
b) dispersing carbon particles in a finely divided form in the solution of step a), in an amount such as to obtain a S/C weight ratio of between 9 and 20;
c) drying the solution with a solvent evaporation rate equal to or less than 0.08 L/h.

In a second aspect thereof, the invention relates to an electrode for Li—S batteries made with the composite material obtained by the process described above, characterized by having a sulfur to carbon ratio of between 9 and 20.

Finally, in a third aspect thereof, the invention relates to an electrode for Li—S batteries prepared with said composite material.

BRIEF DESCRIPTION OF THE FIGURES

The invention will be described below with reference to the figures, in which:

FIG. 1.a shows a scanning electron microscope (SEM) photomicrograph of particles of a composite material obtained according to the invention, using carbon in the form of graphene and ethanol as solvent, with a sulfur to graphene weight ratio equal to 9; FIG. 1.b shows an EDS (Energy Dispersive X-ray Spectrometry) spectroscopy image of the same sample of particles of FIG. 1.a;

FIG. 4.a shows the voltage profile for the first discharge/recharge cycle of a lithium-sulfur battery produced with a material of the invention having a S:C ratio of 9; FIG. 4.b shows the specific capacity as a function of the number of discharge/recharge cycles for the same battery.

DETAILED DESCRIPTION OF THE INVENTION

The process of the invention consists in dissolving sulfur in a solvent to which carbon in suspension is added in a form with a high specific area, and then removing the solvent thus depositing sulfur on the carbon, operating under the particular conditions indicated above, and specifically with a S/C weight ratio in the initial solution of between 9 and 20.

The invention is quite surprising based on what is known from the state of the art, in particular from the patent application CN 103700859 A and the article by H. Tan et al. mentioned above, that describe a constant worsening of the properties of electrodes obtained with sulfur-carbon composite materials as the weight ratio between the two elements increases, and report an upper limit of this ratio equal to about 8.09 and 5.67, respectively, values at which, however, specific capacities are too low for industrial applications; vice versa, the materials of the invention, produced with methods different from those of the prior art documents, show an improvement in properties as the sulfur-carbon ratio increases, and optimal specific capacity values for a value of this ratio of 9 and higher.

In step a) of the process, a sulfur solution is prepared in a liquid having a boiling temperature lower than the melting point of the element, that is about 115° C., by operating at a temperature of between 15° C. and the boiling temperature of the solvent. The liquid must be a good solvent for sulfur, so for example water, in which the element is insoluble, cannot be used for the purposes of the invention. Carbon disulfide, $CS_2$, is a good solvent for sulfur and has the required boiling temperature, but as described in the cited article by H. Tan et al., materials produced with this solvent show a rapid worsening of the specific capacity as the S:C ratio increases, and irrespective of this ratio, with the discharge/recharge cycles. The inventors observed that liquids suitable for use as a solvent in the present invention are in particular methyl, ethyl, n-propyl (1-propanol), isopropyl (2-propanol), isobutyl (2-methyl-1-propanol) alcohols, and acetone. Approximate sulfur solubility values at 25° C. in these solvents (in g/L) are given below:

methanol: 0.8;
ethanol: 0.6;
1-propanol and 2-propanol: 0.7;
2-methyl-1-propanol: 0.5;
acetone: 0.9.

The solubility of sulfur in these solvents increases with increasing temperature, so by operating at temperatures above 25° C., and up to the boiling temperature of the specific solvent used, it is possible to obtain concentrations of dissolved sulfur in solution higher than those indicated above.

To improve the productivity of the process, it is preferable to operate at sulfur concentrations equal or close to the maximum possible values depending on the solvent and dissolution temperature adopted, and in any case preferably not lower than 0.1 g/L.

Sulfur may be used in different structure and morphology forms, such as sulfur powder, sublimed sulfur, and sulfur granules. To increase the dissolution rate of the element, it is possible to stir the system while increasing its temperature up to 80° C., or up to the boiling temperature for solvents having a boiling temperature lower than 80° C.; alternatively, it is possible to use an ultrasonic bath for a few hours.

In step b), the carbon material is added to the solution thus obtained, in such an amount that the S:C weight ratio is of between 9 and 20. Said material must be in a finely divided form, so as to have a large specific surface (surface area per unit of weight), and electrochemically stable in the 1.5-3 V range with respect to lithium. Carbon forms suitable for the purposes of the invention are, for example, micrometric graphite (having a size≤50 μm), graphene, reduced graphene oxide, carbon nanotubes (CNTs), carbon fibers, carbon microspheres, carbon black, and the like. Preferred carbon forms for the purposes of the invention are graphene and multi-walled carbon nanotubes (MWCNTs), both easily available commercially; graphene may also be obtained in flakes by drying the dispersion of graphene flakes obtained by exfoliating graphite in N-methyl-2-pyrrolidone using micronization by liquid jets or wet jet milling, as described in patent application WO 2017/089987 A1 in the name of the Applicant.

To obtain a homogeneous dispersion of the carbon material in the solution, the mixture is preferably stirred by means of an ultrasonic bath.

As mentioned, the carbon material is used in such amounts that the condition 9≤S:C≤20 is met and, in this range. The present inventors have observed that, operating under the conditions of the present invention, contrary to what is described in the article by H. Tan et al. and in the patent application CN 103700859 A mentioned above, the specific capacity of the electrode obtained with the composite material increases as the S:C ratio increases; as shown in more detail in the examples section, by operating with the S:C ratio of 9, a material is obtained that, once formed in an electrode, has a specific capacity close to 1600 mAh/g, and reaches a plateau value of about 1500 mAh/g after 10 discharge/recharge cycles.

Finally, in step c) of the process, the solvent is evaporated at a rate equal to or less than 0.08 L/h. The inventors observed that higher solvent evaporation rates lead to the formation of sulfur particles of too small size, which are dispersed in a random way among the carbon material particles. Conversely, with an evaporation rate according to the invention, sulfur in solution is able to crystallize leading to particles of micrometric size, which are then uniformly coated by the carbon material; in this way, the layer of particles of carbon material forms a protective shell that prevents the transport of polysulfides towards the lithium anode, thus eliminating or significantly reducing the shuttle effect. The specific size of the sulfur particles coated with carbon depend on various factors, in particular the selected solvent, but operating with the indicated evaporation rate the desired results of high capacity and stability of the electrode over time are obtained in any case. The evaporation rate may be easily adjusted, as it is known to those skilled in the art, and optionally with the aid of a few preliminary indicative tests, by adjusting the temperature in the range between 25° C. and the boiling temperature of the solvent and/or by adjusting the pressure to a value of below 800 mbar.

In its second aspect, the invention relates to the composite material obtained by the process described so far.

Figure 1:
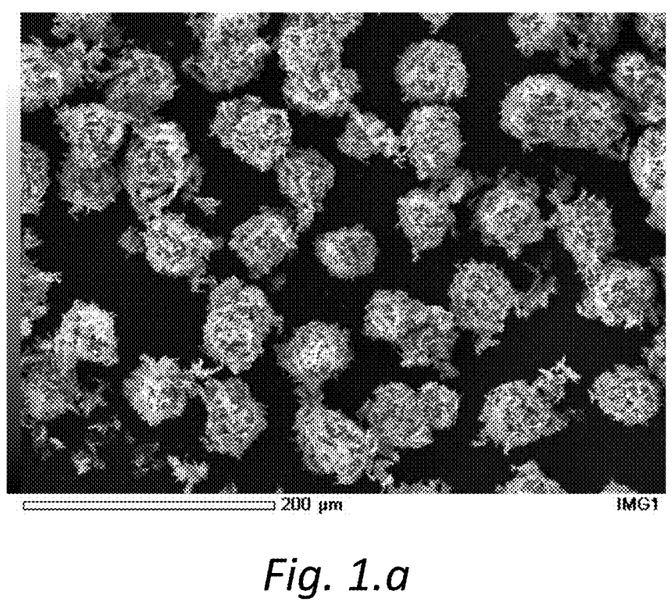
Figure 2:
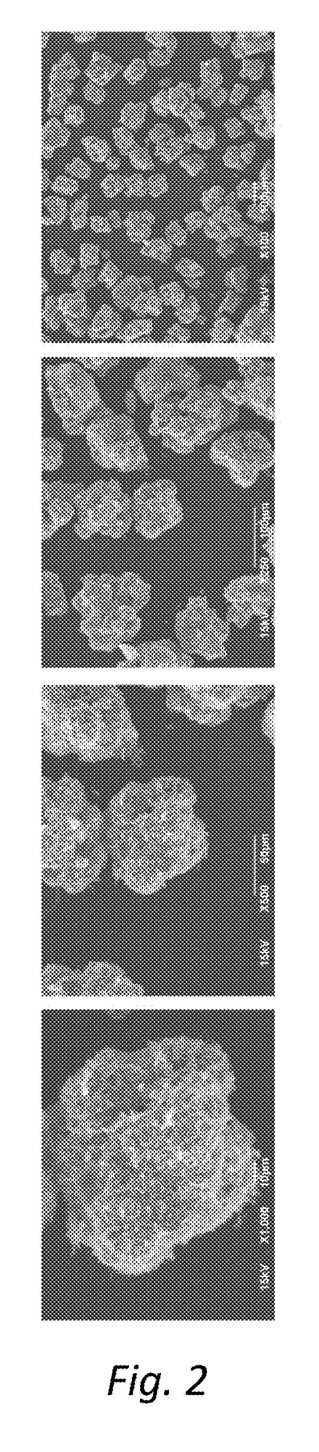
FIG. 2 shows SEM images at four different magnifications of particles of a composite material of the invention obtained using carbon in the form of nanotubes and ethanol as a solvent.
Figure 3:
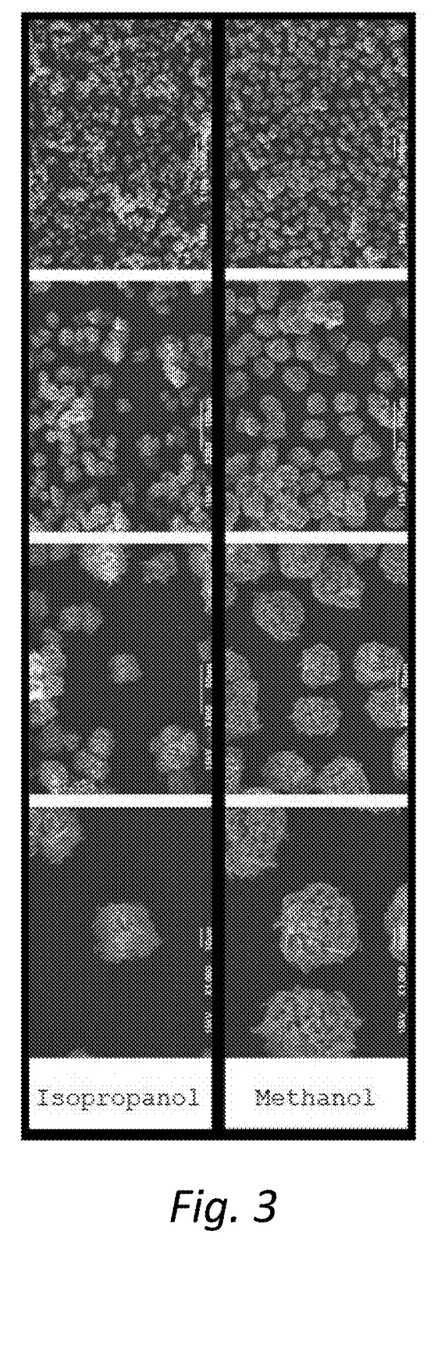
FIG. 3 shows SEM images, at four different magnifications, of particles of two composite materials of the invention obtained using carbon in the form of graphene and isopropanol and methanol as solvent, respectively.
Figure 4:
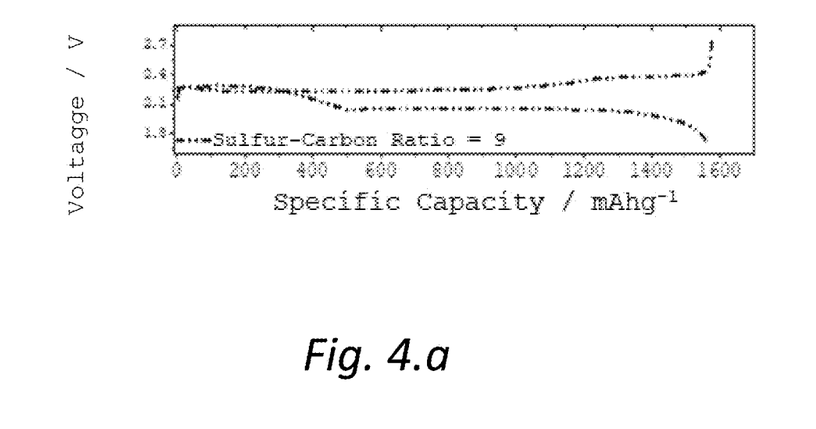

This material is in the form of almost spherical particles, or in any case with similar size in the three directions (a characteristic that can be referred to as an aspect ratio of approximately 1), as it can be observed in the photomicrographs of FIGS. 1-3.

The particles consist of a core consisting of a crystalline particle of sulfur, coated by particles of the selected carbon material that form a compact shell around the core. The particle sizes vary depending on the preparation conditions, and in particular on the solvent and on the carbon material selected: with graphene, using isopropanol, the inventors obtained particles of overall smaller dimensions, with diameters of about 25 μm, while using others solvents the diameter is in the range of 40-50 μm; using carbon nanotubes and ethanol instead, particles with an average diameter of 70 μm were obtained.

Although an analysis of the particle size distribution was not carried out, it is apparent from the photomicrographs that, for any given set of process conditions, the particles obtained all have very similar sizes, thus with a monomodal and relatively narrow size distribution.

Finally, in its third aspect, the invention relates to an electrode for Li—S batteries produced using the particles of composite material described above.

This electrode may be prepared by using the sulfur-carbon materials of the invention mixed with polyvinylidene-fluoride binder and Super P® conducting agent (carbon black; registered trademark of Imerys Graphite & Carbon Switzerland Ltd.), and distributing the mixture on the current collector that can be, for example, an aluminum sheet or a carbon fabric as an electrode; for distributing the mixture on the current collector it is possible to use a calender or a doctor blade system.

The invention will be further described in the following experimental part.

Instrumentation
  JEOL JSM-6490LA Scanning Electric Microscope (SEM);
  MACCOR model 4300 electrical properties measurement system.

Example 1

This test refers to the preparation of a sulfur-carbon composite material with graphene.

1 L of ethanol and 0.6 g of Sigma-Aldrich sublimated sulfur were charged into a flask. Sulfur was completely dissolved using an ultrasonic bath for about 2 hours at 25° C. 0.067 g of graphene flakes, obtained by exfoliating graphite in N-methyl-2-pyrrolidone using micronization by liquid jets according to patent application WO 2017/089987 A1, were added to the solution thus obtained. The suspension was made homogeneous by ultrasonic stirring for a further 2 hours.

The solvent was then evaporated at a rate of 0.08 L/h overnight.

The particles thus obtained were analyzed by SEM; images are shown in FIG. 1.a, depicting the particles, and FIG. 1.b, reproducing the same image in EDS mode. The photomicrograph of FIG. 1.a shows that the particles obtained have an average diameter of between about 40 and 50 μm.

Example 2

This test refers to the preparation of a sulfur-carbon composite material with carbon nanotubes.

The procedure of Example 1 was repeated under identical conditions, with the only difference that multiple-walled carbon nanotubes (MWCNT) by Sigma-Aldrich were used as the carbon material. The composite material obtained is shown, at four different magnifications, in FIG. 2.

The particle size of the composite obtained is homogeneous and of about 70 μm. The shape of the particles is not approximately spherical as in the case of materials obtained with graphene, and appears to be polyhedral; nevertheless, this shape is such as not to have a larger size in one of the three spatial directions (aspect ratio approximately equal to 1), it is also in this case homogeneous and with essentially monomodal dimensional distribution, and the carbon material layer fully covers the sulfur particle core in complete analogy with what was observed for materials prepared with graphene.

Example 3

This test refers to the preparation of sulfur-carbon composite materials with different solvents.

The test of Example 1 was repeated twice using different solvents; in the first case isopropanol was used, in the second case methanol was used. Solvents evaporation was carried out by operating at 345 mbar and 60° C. in the case of isopropanol, and at 765 mbar and 60° C. in the case of methanol.

The two materials are shown, each at four different magnifications, in FIG. 3.

The two samples obtained differ in the average particles size, which is about 25 μm in the case of isopropanol and about 40 μm in the case of methanol. Apart from this difference, the morphology of the particles is exceptionally homogeneous both in terms of shape and size thereof, with the sulfur core wholly coated by graphene.

Example 4

This test refers to the electrical characterization of electrodes prepared with composite materials of the invention.

The material produced in Example 1 was characterized in a lithium metal half-cell using as the anode a button-type 2032 lithium metal, Celgard® separator (registered trademark of Celgard LLC, North Carolina, USA) soaked with a mixture of 1,3-dioxolane and 1,2-dimethoxyethane in a 1:1 weight ratio, 1 mol/kg of lithium bis-(trifluoromethane) sulfonimide and 0.5 mol/kg of lithium nitrate as electrolyte; the material of the invention was used in a mixture with polyvinylidene-fluoride binder and Super P® conducting agent in a 80:10:10 weight ratio, distributed on the AvCarb carbon fabric current collector as a cathode. The cell was assembled in an argon-filled glove chamber with moisture and oxygen content below 1 ppm. The cell thus obtained was characterized with a MACCOR 4300 instrument at controlled temperature set at 25° C., with a current of 1 C=1675 mAh/g in the voltage range of 1.8-2.7 V, with 24 hours of rest before performing the test.

FIG. 5.a shows the voltage profile of the first cycles of the lithium half-cell with a S:C ratio of 9, at a current rate of 1 C. The cell offers an exceptional specific capacity of about 1600 mAh/g at the high current rate of 1 C, with a limited polarization, thus demonstrating that the innovative active material production process is suitable for the production of a lithium-sulfur battery with high performance. Furthermore, FIG. 5.b shows the cyclic behavior of the battery and reveals its high stability. In fact, after a slight decrease in the specific capacity during the first 5 cycles, mainly attributed to a limited dissolution of sulfur with possible formation of a slight amount of soluble lithium polysulfides, the cell of the invention is stable with a flat profile. The specific capacity of the cell reaches the value of 1500 mAh/g at the tenth cycle, thus confirming that the production process of the invention is suitable for producing high energy density Li—S batteries.

The invention claimed is:

1. A process for the production of a sulfur-carbon composite material that includes the following steps:
   a) preparing a sulfur solution in a solvent different from carbon disulfide and having a boiling temperature lower than the melting temperature of sulfur, operating at a temperature of between 15° C. and the boiling temperature of the solvent, wherein the solution consists of sulfur dissolved in the solvent;
   b) dispersing carbon particles in a finely divided form in the solution of step a), in an amount such as to obtain a S/C weight ratio of between 9 and 20;
   c) drying the solution with a solvent evaporation rate equal to or less than 0.08 L/h.

2. The process according to claim 1, wherein the solvent used in step a) is selected from methyl alcohol, ethyl alcohol, n-propyl alcohol (1-propanol), isopropyl alcohol (2-propanol), isobutyl alcohol (2-methyl-1-propanol), and acetone.

3. The process according to claim 1, wherein the sulfur solution prepared in step a) has a concentration of between 0.1 g/L and the solubility of sulfur in the solvent and at the temperature used.

4. The process according to claim 1, wherein the sulfur solution of step a) is prepared at a temperature equal to or lower than 80° C., or equal to or lower than the boiling temperature in case of solvents having a boiling temperature lower than 80° C.

5. The process according to claim 1, wherein the sulfur solution of step a) is prepared using an ultrasonic bath for at least 2 hours.

6. The process according to claim 1, wherein the carbon particles used in step b) are selected from micrometric graphite having a size≤50 μm, graphene, reduced graphene oxide, carbon nanotubes (CNTs), carbon fibers, carbon microspheres, and carbon black.

7. The process according to claim 1, wherein step c) is carried out at a temperature of between 25° C. and 80° C. and/or by adjusting the pressure to a value lower than 800 mbar.

8. A sulfur-carbon composite material obtained according to claim 1.

9. The material according to claim 8, consisting of particles with a monomodal size distribution having an average diameter of about 25 μm when graphene and isopropanol as solvent are used, a diameter in the range of 40-50 μm when graphene and a solvent different from isopropanol are used, and an average diameter of 70 μm when carbon nanotubes and ethanol as a solvent are used.

10. A Li—S battery electrode formed by a mixture of particles of the sulfur-carbon composite material of claim 8, polyvinylidene-fluoride as a binder and carbon black, said mixture being distributed on a current collector selected from an aluminum sheet or a carbon fabric as an electrode.

* * * * *